(12) United States Patent
Strasdat et al.

(10) Patent No.: US 9,597,983 B2
(45) Date of Patent: Mar. 21, 2017

(54) ARRANGEMENT FOR A VEHICLE INTERIOR, MOTOR VEHICLE

(71) Applicant: Volkswagen Aktiengesellschaft, Wolfsburg (DE)

(72) Inventors: Bjoern Strasdat, Braunschweig (DE); Manuel Joachim, Braunschweig (DE); Eva Berner, Braunschweig (DE); Sylvain Fischer, Braunschweig (DE); Thomas Drescher, Gifhorn (DE); Ralf Welp, Braunschweig (DE); Maximilian Barthel, Markkleeberg (DE); Nils Sajonz, Sickte (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/955,450

(22) Filed: Dec. 1, 2015

(65) Prior Publication Data
US 2016/0152163 A1    Jun. 2, 2016

(30) Foreign Application Priority Data
Dec. 1, 2014   (DE) .................. 10 2014 224 560

(51) Int. Cl.
| | | |
|---|---|---|
| *B60N 2/005* | (2006.01) | |
| *B60R 11/00* | (2006.01) | |
| *B60N 2/24* | (2006.01) | |
| *B60N 2/14* | (2006.01) | |
| *B60N 3/00* | (2006.01) | |

(Continued)

(52) U.S. Cl.
CPC ............... *B60N 2/24* (2013.01); *B60N 2/067* (2013.01); *B60N 2/143* (2013.01); *B60N 3/002* (2013.01); *B60Q 9/00* (2013.01); *B60R 7/04* (2013.01); *B60R 11/0235* (2013.01); *B60R 2011/0014* (2013.01); *B60R 2011/0082* (2013.01); *B60R 2011/0282* (2013.01); *B60R 2011/0294* (2013.01)

(58) Field of Classification Search
CPC ............................... B60N 2/143; B60N 2/067
USPC .................... 296/24.34, 37.8, 37.14
See application file for complete search history.

(56) References Cited

U.S. PATENT DOCUMENTS

| | | | |
|---|---|---|---|
| 2,240,620 A | 5/1941 | Hill | |
| 6,086,129 A * | 7/2000 | Gray ..................... | B60K 37/00 296/37.8 |

(Continued)

FOREIGN PATENT DOCUMENTS

| | | |
|---|---|---|
| DE | 198 16 031 A1 | 10/1999 |
| DE | 103 35 046 A1 | 2/2005 |

(Continued)

*Primary Examiner* — Dennis H Pedder
(74) *Attorney, Agent, or Firm* — Muncy, Geissler, Olds & Lowe, P.C.

(57) ABSTRACT

An arrangement for a vehicle interior having a first seat row, which includes at least one seat, and having a second seat row, which is disposed in the vehicle interior in front of or behind the first seat row and includes at least one seat, the first seat row being disposed in or on a plate which is rotatably supported in or on a floor of the vehicle interior. It is provided that at least one movably supported console is provided, and the console is movable along at least one rail, which is disposed in or on the floor of the vehicle, the rail having a multi-part design and being disposed in or on the plate, at least in areas.

14 Claims, 8 Drawing Sheets

(51) Int. Cl.
  *B60N 2/06* (2006.01)
  *B60R 11/02* (2006.01)
  *B60Q 9/00* (2006.01)
  *B60R 7/04* (2006.01)

(56) References Cited

U.S. PATENT DOCUMENTS

| | | | |
|---|---|---|---|
| 6,991,060 B2 | 1/2006 | Chernoff et al. | |
| 7,681,936 B2* | 3/2010 | McClintock | B60R 5/04 296/26.08 |
| 2003/0234550 A1* | 12/2003 | Brooks | B60N 2/4646 296/24.46 |

FOREIGN PATENT DOCUMENTS

| | | | |
|---|---|---|---|
| EP | 1 449 709 B1 | | 6/2009 |
| JP | 09-109778 A | | 4/1997 |
| JP | 11-187166 | * | 7/1999 |

* cited by examiner

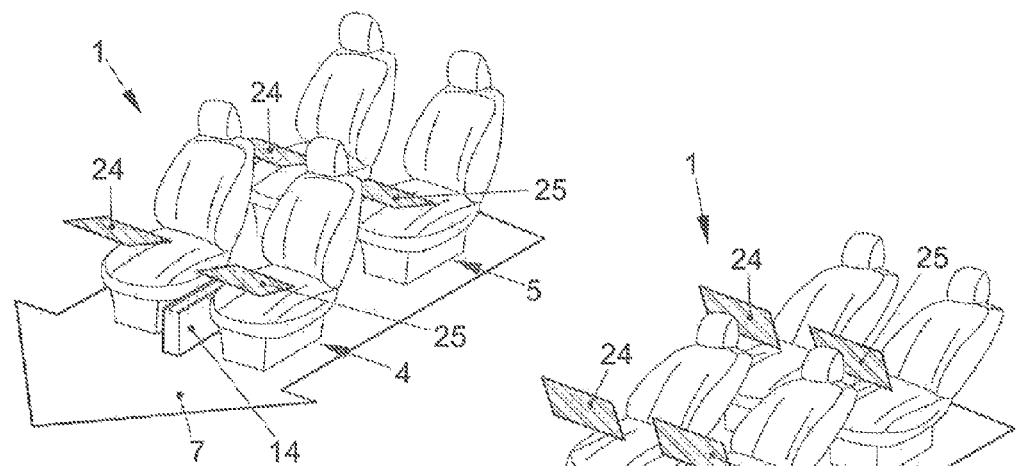
FIG. 7A
FIG. 7B
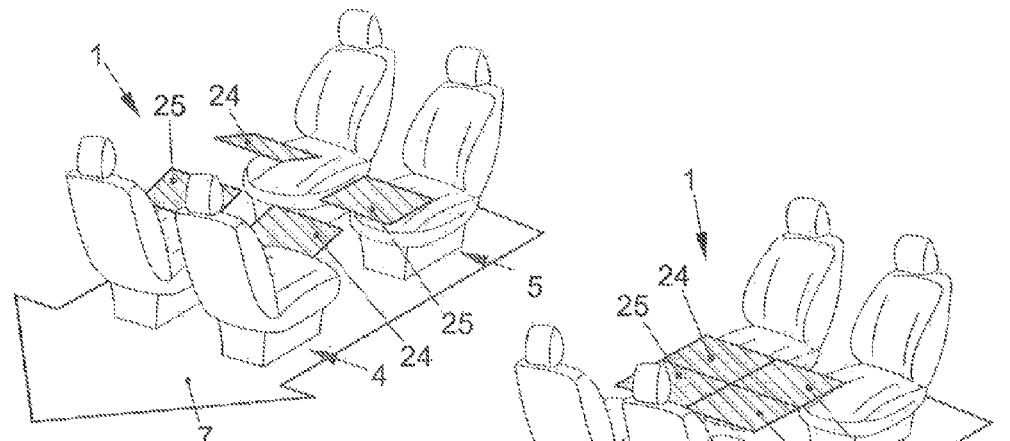
FIG. 7C
FIG. 7D

ARRANGEMENT FOR A VEHICLE INTERIOR, MOTOR VEHICLE

This nonprovisional application claims priority under 35 U.S.C. §119(a) to German Patent Application No. 10 2014 224 560.5, which was filed in Germany on Dec. 1, 2014, and which is herein incorporated by reference.

BACKGROUND OF THE INVENTION

Field of the Invention

The invention relates to an arrangement for a vehicle interior, comprising a first seat row, which includes at least one seat, and comprising a second seat row, which is disposed in the vehicle interior in front of or behind the first seat row and includes at least one seat, the first seat row being disposed in or on a plate which is rotatably supported in or on a floor of the vehicle interior. The invention furthermore relates to a motor vehicle, comprising a vehicle interior which includes an arrangement of this type.

Description of the Background Art

Arrangements and motor vehicles are known from the prior art. For example, patent specification U.S. Pat. No. 6,991,060 B2 discloses a vehicle, which comprises a vehicle interior, in which two seats of a first seat row are disposed on a plate which is rotatable with respect to the vehicle interior, the seats, in turn, being designed to be rotatable with respect to the rotatable plate. By rotating the rotatable plate with respect to the vehicle interior and/or the seat with respect to the rotatable plate, different seat positions may be set within the vehicle interior. In particular, it is possible to move a seat of the first seat row by rotating the rotatable plate in such a way that it is disposed opposite a second seat row, rotated by 180°. In the vehicle described, an arrangement of the seats which is comfortable for the vehicle passengers and facilitates communication may be achieved thereby.

An arrangement for a vehicle interior is also known from the patent specification EP 1 449 709 B1, which provides at least one console which is movably supported on a floor of the vehicle interior. so that, depending on the requirements, the console may be assigned to a first, second or third seat row.

SUMMARY OF THE INVENTION

It is therefore an object of the invention to provide an arrangement in a motor vehicle, which has improved characteristics, in particular with respect to variability and user friendliness.

The object of the invention is achieved in an exemplary embodiment by an arrangement that has the advantage that, despite the variability of the first seat row, a movable console is provided, which is adaptable to the needs of the occupants of the vehicle. For this purpose, it can be provided that at least one movably supported console, in particular a central console, is provided, and the console is movable along at least one multi-part rail which is disposed in or on the floor of the vehicle, the rail running in or on the plate, at least in areas. The console is thus movably supported both on the floor and on the plate in the area of the first seat row, so that a vehicle occupant, in particular a vehicle occupant sitting on a seat of the first seat row, is able to move the console toward himself, even though his seat is disposed on the rotatable plate. The arrangement according to the invention furthermore makes it possible that the console is movable away from the rotatable plate on the floor of the vehicle interior, so that, in particular, a rotation of the plate without the console is possible.

Due to the limited space conditions in a vehicle interior, it is often not readily possible to easily rotate the first seat row, in particular if it includes two or more seats. The seats of the first seat row are therefore advantageously pushed against each other and/or rotated during a rotation of the plate, so that the available space may be optimally utilized. Due to the fact that the console is movable downward to the floor from the rotatable plate, the advantage arises that the plate and the first seat row are rotatable independently of the console, and the console is movable, in particular, out of the path of movement of the seats of the first seat row.

Conversely, the console is movable away from the floor onto the rotatable plate. A suitable arrangement and dimensioning of the console and the rotatably supported plate gives rise to the advantage that the plate is jointly rotatably together with the first seat row disposed thereon and the console disposed thereon. The spatial, relative arrangement of the first seat row and the console does not change with this joint rotation, so that a person sitting on a seat of the first seat row will continue to find the console to be in the customary position relative to his seat.

The at least one seat of the first seat row may be advantageously designed to be movable and/or rotatable relative to the rotatable plate with the aid of mechanisms that are known per se. The variability of the arrangement is even further increased thereby.

According to an embodiment of the invention, it is provided that the rail extends beyond the plate from a front end or a rear end of the vehicle in the vehicle interior, in particular from the area of an armrest or an instrument panel of the vehicle interior. As a result, the console may be disposed along the rail at any arbitrary point in or on the plate. The console can include a locking which permit the console to be locked at an arbitrary point along the rail. Doe to the fact that the rail extends beyond the plate, it is ensured that, if the plate is rotated 180°, the console may be placed from the floor back onto the section of the rail situated in or on the plate, or that the console may be placed from the section of the rail situated in or on the plate back onto the floor. As a result, the console may be made available to the occupants even if the seat row was rotated 180° from a forward position to a backward position. It is provided, in particular, that the rail extends to such a far degree that the console is movable into the area between the first and second seat rows, so that the console may be used by occupants of both seat rows. The rail preferably extends along a central longitudinal axis of the vehicle interior, in particular all the way between two seats of the first seat row. Alternatively, it may also be provided that the console is movable eccentrically in the vehicle interior, in which case at least two rail sections running in parallel to each other are preferably provided in or on the plate, either the one or the other rail section being in alignment with a rail section disposed in or on the floor as a function of the rotational position of the plate.

The console can be movable along the rail between a position of use situated in or on the plate and a release position situated at a distance from the plate in or on the floor. This results in the aforementioned advantage that the console may be moved out of the path of movement of the plate and, in particular, the first seat row when the plate rotates.

A drive device for the electromotive moving of the console can be assigned to the console. The drive device can be actuated, in particular, when a rotation of the plate is provided. If a rotation of the plate is intended, the drive device advantageously moves the console automatically into the specified release position in or on the floor. Alternatively, the drive device may also previously automatically move during an intentional rotation of the plate into such a position, in which the console is completely disposed in or on the rotatable plate.

The drive device can have a linear chain, which is guided in or on the rail and which is connected to the console. Due to the linear chain, which is actuatable by the drive device, the console may be moved along the rail to an arbitrary point. A security mechanism can be provided, which prevents a rotation of the plate when the linear chain extends in an extended state along the rail both in an area of the plate and in the area of the floor for the purpose of preventing damage to the linear chain during the rotation of the plate.

The drive device or another drive device can be designed to rotate the plate. An easy adjustment of the first seat row is thereby made comfortable for the occupants by means of a motor-driven rotation of the plate. Due to the fact that the drive device moves both the plate and the console, the movements may be easily coordinated in such a way that the console is automatically moved into a release position before the plate is rotated. It may be provided, in particular, that when an occupant requests a rotation of the plate by 180°, for example by actuating a switch, the drive device moves the console from a current position of use into the release position and, after rotating the plate, back into a position of use corresponding to the previous position of use with respect to the seats in the first seat row.

The rail can extend up to the second seat row. As a result, the console may be advantageously moved or pushed up to the second seat row, so that it may also be made available to users of the second seat row.

According to an embodiment, it is also provided that another console is assigned to the second seat row. The users of the second seat row thus advantageously also have their own console available to them.

The additional console can be also movably supported to be able to move along the rail, which in this respect extends up to the second seat row, so that the position of the additional console is adaptable to the needs of the users of the second seat row. Alternatively, it may be provided that a separate rail is assigned to the additional, second console.

At least one of the consoles includes at least one pull-out and/or fold-out table and/or screen. The users of the consoles may thus provide and use a table as needed. Alternatively, the users may pull and/or fold a screen out of the console, for example to use an entertainment program. It may also be provided that the particular screen is designed as a touch-sensitive screen, so that the particular user may use the screen to enter commands, for example for the purpose of work.

The two consoles may be pushed together along the rail, in particular in such a way that the tables of the two consoles form a shared table surface. This results in the advantage that a larger conference table or dining table may be easily provided between the two seat rows, which is formed by the two consoles together. To form the shared table surfaces, the tables abut each other by their facing side edges and can have centering portion and/or a latch which facilitate the joining of the tables and permanently ensure the joining thereof. In particular, it is ensured by the centering portion that a level table surface is formed from the tables.

It is furthermore preferably provided that the consoles are provided with at least one illuminant on their ends facing each other, the luminous intensity and/or luminous color thereof changing as a function of a distance of the consoles from each other. The joining of the consoles may thus be made clear to the user, for example by the color selection or light intensity. In particular, a "merging" of the consoles may be displayed when the latter are joined. In particular, the use experience for the occupants may be improved thereby and a safe handling of the consoles ensured.

At least one of the consoles can have a display on at least one side. A wide range of representations may be shown on the display. Thus, the display may be used only for illumination or, for example, as a digital picture frame or the like.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 7A to 7D show different scenarios of the arrangement;

DETAILED DESCRIPTION

Figure 1A:
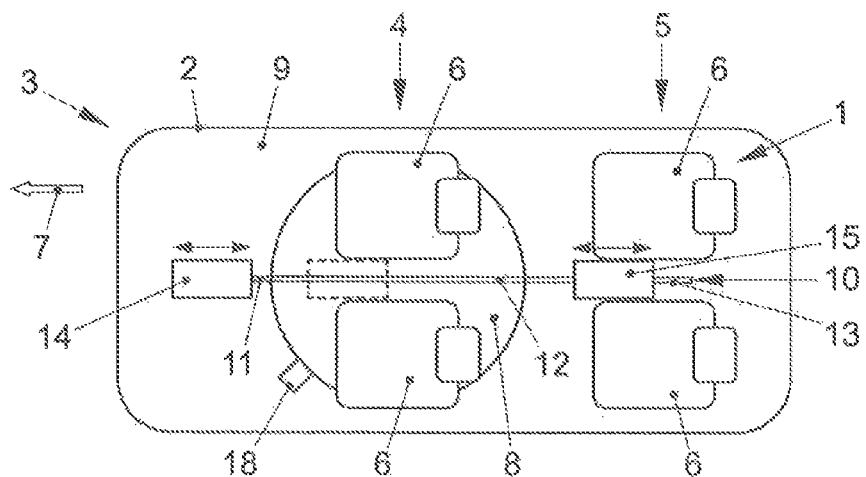
FIGS. 1A to 1C show a vehicle interior which comprises an advantageous arrangement in different use scenarios.
Figure 1B:
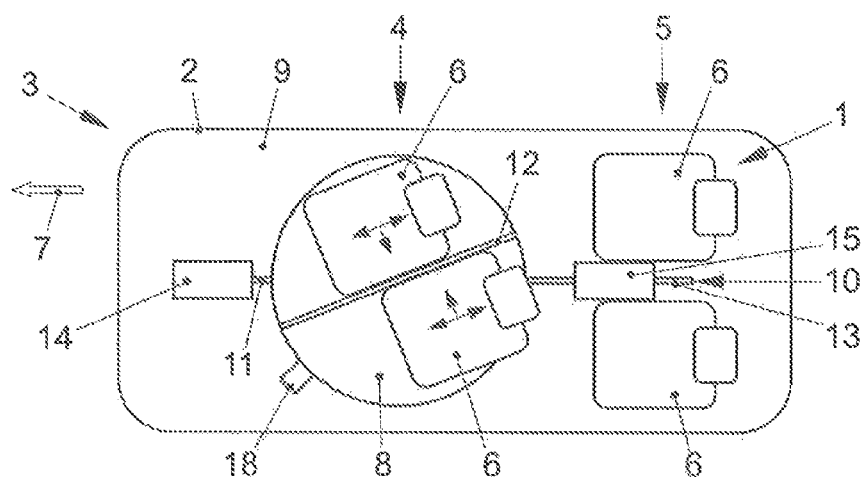
Figure 1C:
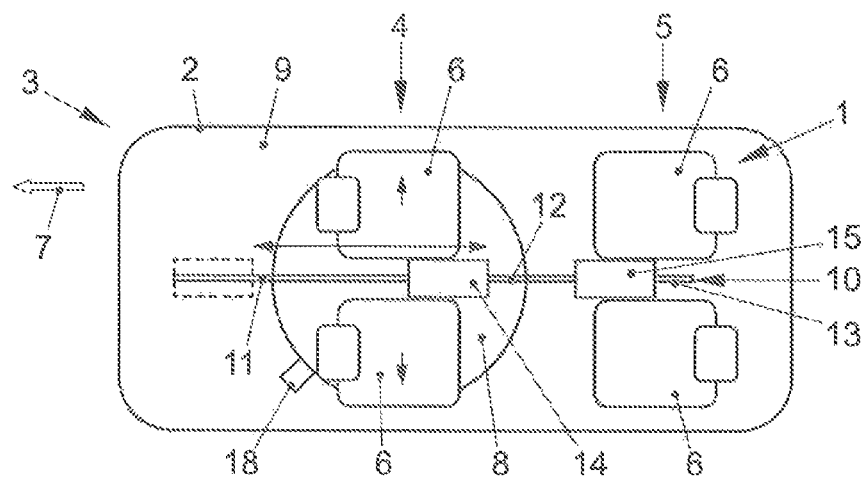

FIGS. 1A through 1C show a simplified top view of an arrangement 1 for a vehicle interior 2 of a motor vehicle 3. Arrangement 1 includes a first seat row 4 as well as a second seat row 5, both seat rows 4, 5 each including two (vehicle) seats 6 disposed next to each other. First seat row 4 is a front seat row, and seat row 5 is a back seat row. To facilitate orientation, an arrow 7 indicates the direction in which motor vehicle 3 moves during normal forward travel.

Seats 6 of first seat row 4 are disposed on a plate 8, which is rotatably disposed on a floor 9 of motor vehicle 3 or of vehicle interior 2. A rotation axis of plate 8 is situated in the center thereof. Plate 8 has a circular design and is situated in an indentation of floor 9, so that its upper side terminates flush with the upper side of floor 9.

Arrangement 1 furthermore includes a rail 10, which extends along a longitudinal center axis of motor vehicle 3 or of vehicle interior 2, from a front end, for example assigned to an instrument panel of motor vehicle 3, to second seat row 5. Rail 10 has a multi-part design, a first section 11 being situated between rotatable plate 8 and the front end, a second section 12 being situated in or on plate 8, and a third section being situated on vehicle floor 9, extending from plate 8 up to between seats 6 of second seat row 5. Rail sections 11, 12, 13 are designed in such a way that they form a continuous rail 10 when plate 8 is in the starting position shown in FIG. 1A or in the position rotated by 180° shown in FIG. 1C. Rail section 12 thus passes through the pivot point of plate 8. In the initial position and in the end position, rail section 12 is thus situated in alignment with rail sections 11 and 13, so that a continuously usable, straight rail 10 is available.

Two consoles 14 and 15 are supported on rail 10 in such a way that they are movable along rail 10, as shown by double arrows. Due to the movability, the users are able to move consoles 14, 15 along rail 10 into a position which is suitable for them.

Figure 2:
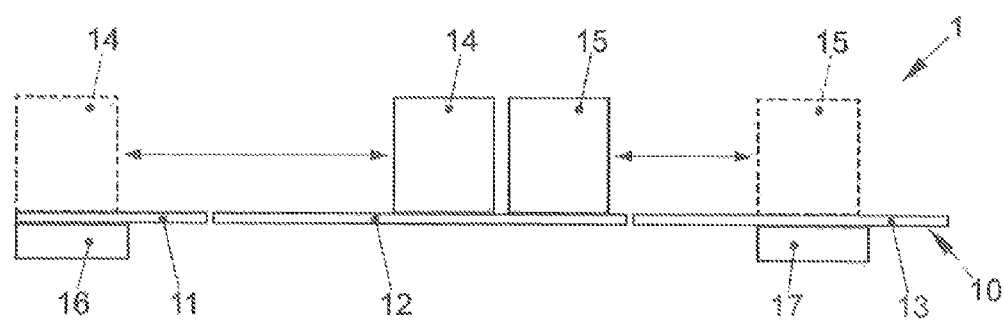
FIG. 2 shows a simplified longitudinal sectional representation of the vehicle interior.

For this purpose, FIG. 2 shows a simplified side view of arrangement 1, including rail 10 and consoles 14, 15. A drive device 16 and 17, respectively, with the aid of which particular console 14, 15 is electromotively movable along rail 10, is assigned to each console 14, 15. For this purpose, FIG. 2 shows consoles 14, 15 in a position of use (solid lines) and in a release position (dashed line), in which consoles 14, 15 are situated on rail sections 11 and 13, respectively, at a distance from plate 8.

The basic functionality of arrangement 1 is explained below with reference to FIGS. 1A through 1C. As mentioned above, seats 6 of first seat row 4 are disposed facing forward in the initial state according to FIG. 1A. With the aid of plate 8, however, seats 6 of first seat row 4 are also movable in the orientation shown in FIG. 1C, in which seats 6 are rotated 180°, so that the occupants in seats 6 of seat rows 4 and 5 find themselves sitting opposite each other. This may be advantageous, for example in an autonomous vehicle operation of motor vehicle 2, in which an intervention of the driver into the vehicle operation is not necessary. To facilitate the rotation of plate 8 without causing seats 6 of first seat row 4 to come into conflict with side walls of motor vehicle 3 or of the vehicle interior, seats 6 are moved against each other and toward each other in an intermediate position during the rotation of plate 8, as shown in FIG. 1B, for the purpose of ensuring a rotation of seats 6 of first seat row 4 in the smallest amount of space.

So that consoles 14, 15 are not situated in the path of movement of seats 6 of first seat row 4, they are moved by particular drive device 16 or 17 into the release position, in which console 14 is situated on the rail section, in particular on its front end, and console 15 is situated on rail section 13, in particular on its back end. Consoles 14, 15 are thus moved safely out of the path of movement of seats 6 of first seat row 4. Another drive device 18 is preferably provided for rotatable plate 8, as indicated in FIGS. 1A through 1C. A control unit is connected to drive devices 16, 17 and 18 for the purpose of coordinated activation of drives devices 16, 17 and 18, the activation ensuring a conflict-free adjustment of arrangement 1, as described above.

Figure 3:
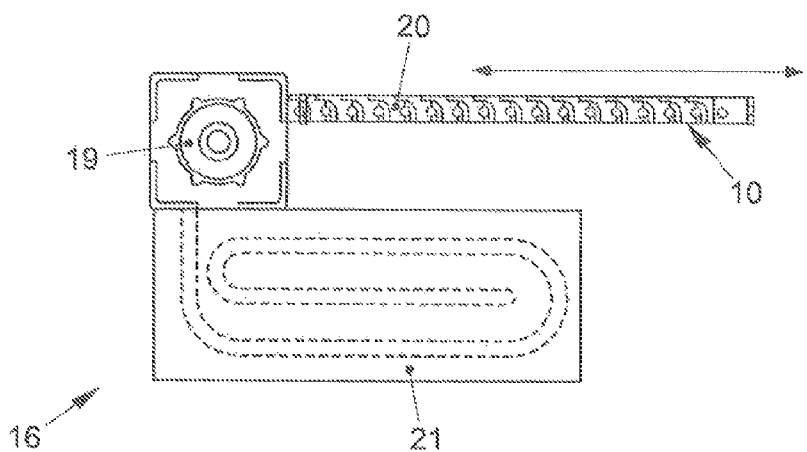
FIG. 3 shows a simplified representation of a drive device.

FIG. 3 shows a simplified representation of a first exemplary embodiment of one of drive devices 16, 17, based on the example of drive device 16. This drive device includes an electric motor 19, which is designed to push a linear chain 20. Linear chain 20 is guided, in particular, in rail 10 and is fixedly connected to console 14 or, in the case of drive device 17, to console 15. In the release position of console 14, linear chain 20 is essentially stowed in a receptacle 21. When console 14 is pushed in the direction of first seat row 4, the linear chain is pushed into rail 10 in the direction of rotatable plate 8. Since rail sections 11, 12 align with each other, linear chain 20 is pushed into rail section 12 when the rotatable plate is in the corresponding position according to FIG. 1A or 1C. Accordingly, console 14 is movable out of the release position into a position between seats 6 of first seat row 4, as shown by way of example in FIG. 1C. The same applies accordingly to drive device 17 of console 15.

Figure 4:
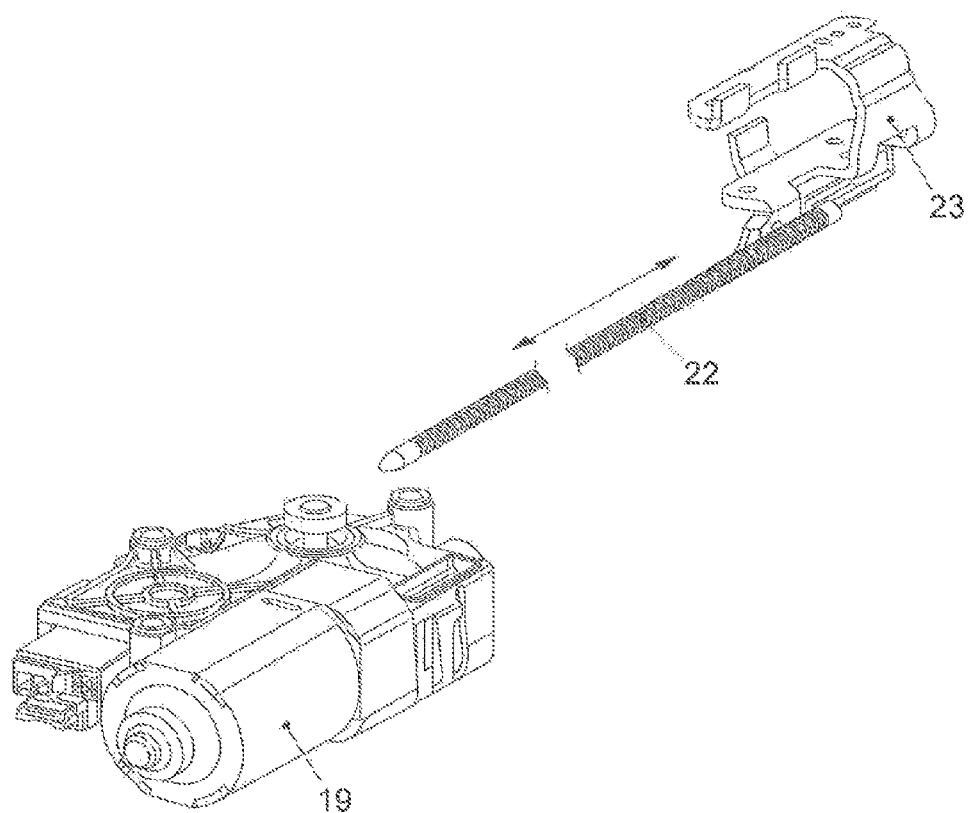
FIG. 4 shows an exemplary embodiment of the drive device.

FIG. 4 shows another exemplary embodiment of drive device 16, 17 based on drive device 16. In contrast to the previous exemplary embodiment, it is provided in this case that drive device 16 is designed in the manner of a drive device for sliding roofs and also includes a spindle 22, drivable by electric motor 19, which is situated at least in rail section 11 and interacts with a spindle nut retainer 23, which is fixedly connected to console 14. Spindle nut retainer 23 is designed in such a way that a spindle nut interacting with spindle 22 is always in the area of rail section 11.

Figure 5:
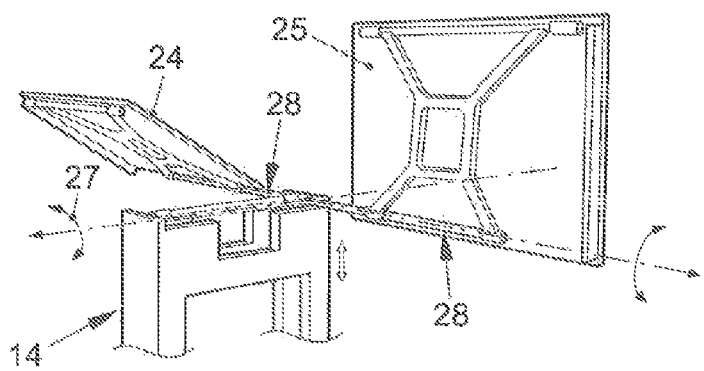
FIG. 5 shows a simplified representation of a console of the arrangement according to an exemplary embodiment.

FIG. 5 shows a simplified detailed view of consoles 14, 15 based on the example of console 14. Console 14 includes two pull-out and fold-out tables 24, 25. In a stowed position, tables 24, 25 are disposed in a stowed manner in console 14, oriented in parallel to each other. To place tables 24, 25 into their position of use, they are first pulled out of console 14, as indicated by an arrow, and then swiveled out to the side around a horizontal axis, as indicated by an arrow 27. Tables 24, 25 are each held on console 14 by a swivel joint 28, so that, in the folded-out position, they may be swiveled by the user into a position which is suitable for him.

Figure 6A:
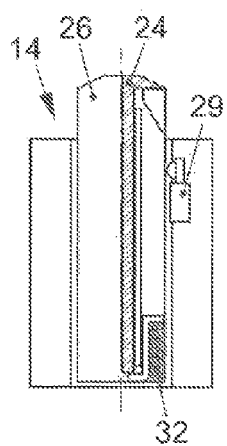
FIGS. 6A to 6F show an exemplary embodiment of the console in different operating states.
Figure 6B:
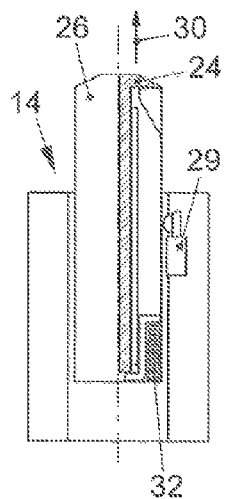
Figure 6C:
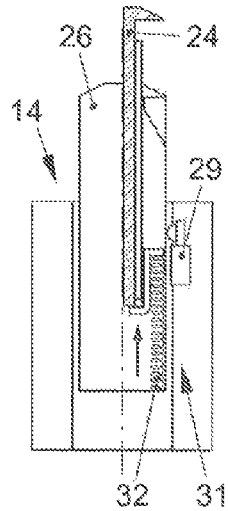
Figure 6D:
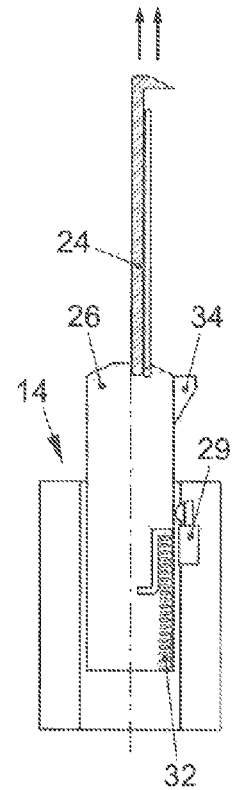
Figure 6E:
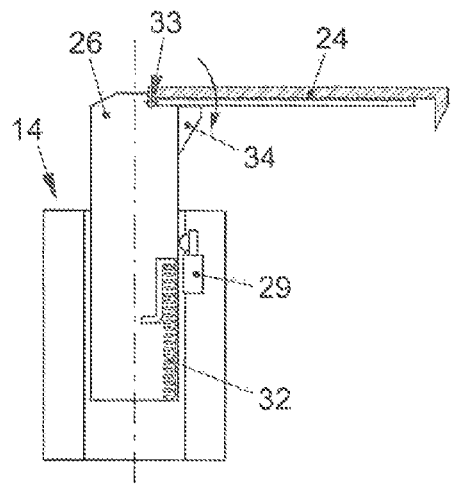
Figure 6F:
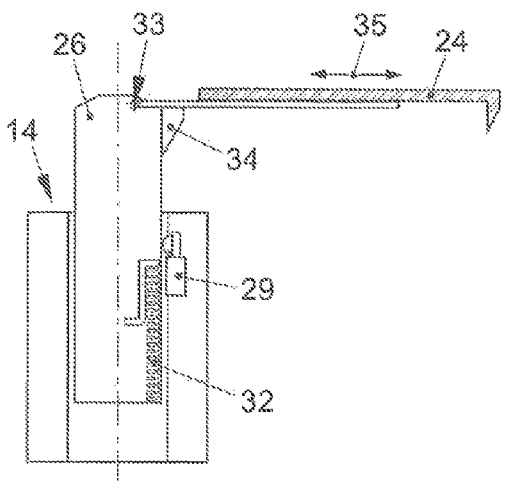

FIGS. 6A through 6F show an alternative exemplary embodiment of consoles 14, 15, based on console 14, whose table 24 is placed in multiple steps from a stowed position according to FIG. 6A into a position of use according to FIG. 6F Table 25 is first disposed in a stowed manner in console 14. Table 24 is disposed in a carrier element 26, which is vertically movable in console 14. An electromotive drive 29, which first moves carrier element 26 out of console 14 according to arrow 30, as shown in FIG. 6B, is provided for vertical movement. Outside console 14, the user may move table 25 out of carrier element 26, for example with the aid of a push-to-open mechanism 31, as shown in FIG. 6C. A pretensioned spring element 32 is assigned to table 24. The user expediently pulls table 24 into a completely pulled-out position, in which table 24 is able to pivot laterally around a pivot axis 33, as shown in FIG. 6D. In the pivoted position, as illustrated by way of example in FIG. 6E, table 24 is expediently situated on a stop 34 of carrier element 26, so that table 24 lies stable. Table 25 has a two-part design, so that the user is able to pull table 24 out laterally, as indicated by a double arrow 35 in FIG. 6F. Table 25 is expediently held in the same manner on console 14, 15 (not illustrated).

Due to arrangement 1, different seat scenarios exist for vehicle interior 2, which are illustrated in FIGS. 7A through 7D. In an initial position according to FIG. 7A, in which seats 6 are disposed according to FIG. 1A, each user may use the table of particular console 14, 15 assigned to him in the folded-out position. Seats 6 are preferably designed as reclining seats, so that they may be transitioned from a seated position to a reclined position, as shown in FIG. 7B.

When plate 8 is rotated by 180°, as explained above, seats 6 of seat rows 4 and 5 are oriented in such a way that the persons sitting on them look at each other, as shown in FIGS. 1C and 7C. In this position, the users may use table 25 or 24 assigned to them as described above if console 14, 15 was pushed into the corresponding position, in particular electromotively.

Consoles 14, 15 are preferably designed in such a way that they may be brought together on rail 10 in such a way that tables 24, 25 of both consoles 14, 15 form a shared table surface 36, as shown in Figure D [sic; 7D]. With their tables 24, 25, consoles 14, 15 thus form a single table, which is disposed between seats 6 of seat rows 3 and 4 and which may be used, for example, as a conference table or dining table.

According to another exemplary embodiment, it is preferably provided that tables 24, 25 includes a display, the display being designed in the manner of a tablet computer, so that the table include, in particular, a touch-sensitive screen, on which the user may make entries or display media content.

Figure 8:
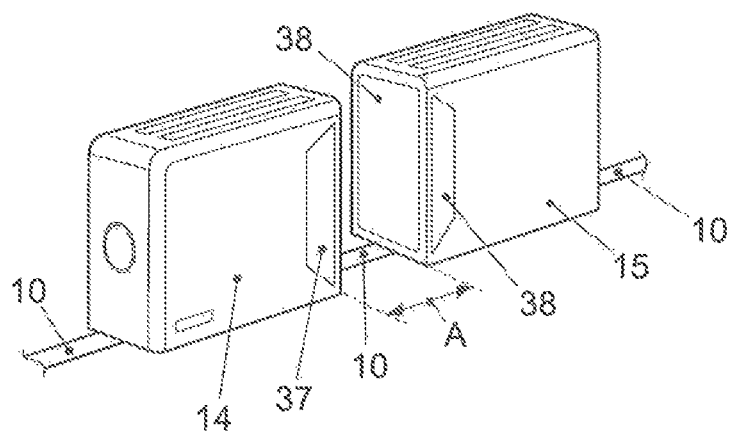
FIG. 8 shows a simplified perspective representation of another exemplary embodiment.

FIG. 8 shows a simplified representation of consoles 14, 15 having stowed tables 24, 25. Consoles 14, 15 each have illuminants 37, 38, for example LEDs or LED light strips, on their facing end sides, in particular in the manner of illuminated strips, which also extend in areas over the side walls of consoles 14, 15. The facing front sides of consoles 14, 15 are particularly preferably illuminatable and are provided, in particular, with an illuminant, particularly preferably with a display. Illuminants 37, 38 are activated as a function of distance A of consoles 14, 15 from each other. According to one first exemplary embodiment, it is provided that an illumination intensity of the illuminants is changed as a function of distance A.

Figure 9:
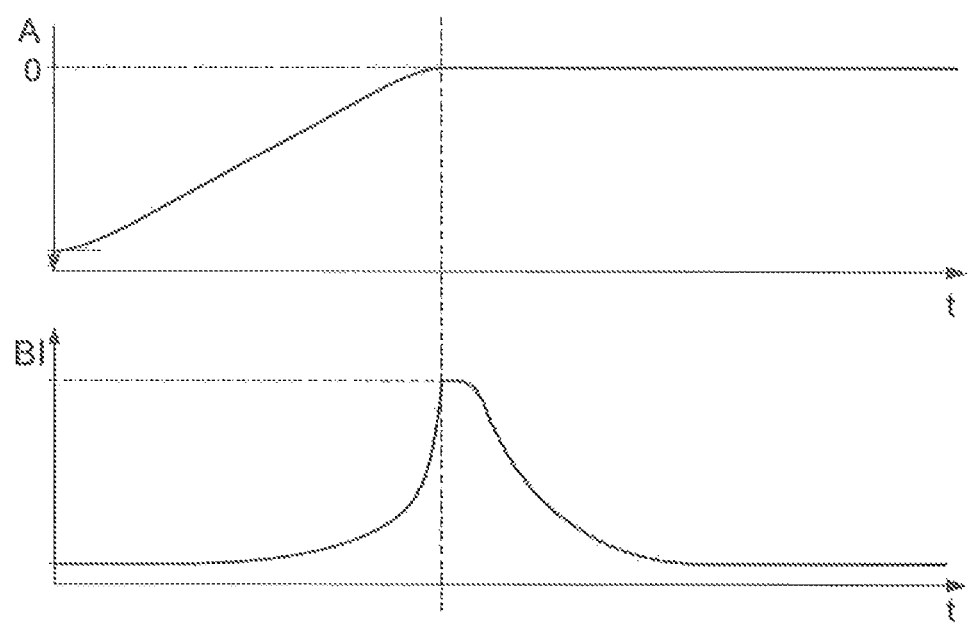
FIG. 9 shows an illumination behavior of the console according to a first exemplary embodiment.

In a top diagram, FIG. 9 shows a distance A of consoles 14, 15 from each other, the dashed line displaying distance A=0, in which the consoles abut each other by their facing front sides. The bottom diagram shows an illumination intensity BI of the illuminant of consoles 14, 15, also plotted over time t. Consoles 14, 15 are initially in the normal state, i.e., in the state spaced apart from each other, controlled by a basic illumination, so that they radiate subdued light. As distance A decreases, the intensity increases up to the point in time at which consoles 14, 15 meet each other (dashed vertical line). This point is understood to be the "merging point" at which consoles 14, 15 are connected into a shared console, so that, for example, the shared table having table surface 36 may be used. Once consoles 14, 15 have been guided to each other, illumination intensity BI decreases over time to return to the basic illumination. With the aid of the illumination control, the merging of the consoles is displayed to the user and, in particular, a successful merging of consoles 14, 15 is shown. This is advantageous, in particular, if the user pushes consoles 14, 15 manually.

Figure 10:
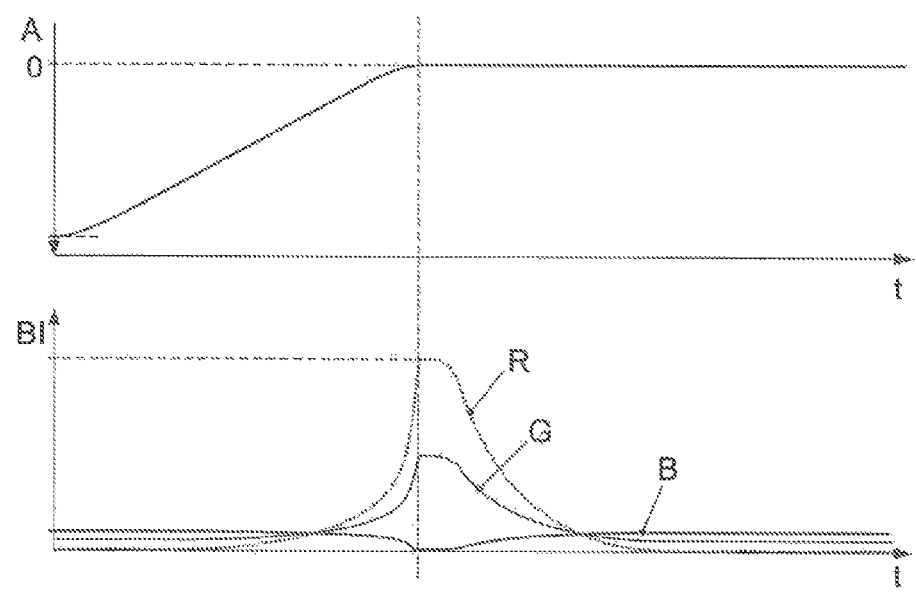
FIG. 10 shows an illumination behavior of the console according to a second exemplary embodiment.

Alternatively to the illumination intensity using only one color, as explained in FIG. 9, it is provided according to another exemplary embodiment, which is shown in FIG. 10, that not only the illumination intensity but also the color selection is changed along with distance A of consoles 14, 15 from each other. It is provided, in particular, that the illumination intensity of the colors red, green and blue is changed as a function of distance A. A first line R in the bottom part of the diagram in FIG. 10 shows the illumination intensity of the color red, another line G shows the illumination intensity of the color green, and another line B shows the illumination intensity of the color blue. The merging of consoles 14, 15 may thus also be emphasized by color.

An arrangement 1 for vehicle interior 2, which provides a high variability of consoles 14, 15 with a high degree of user-friendliness is derived from all of the above, a safe rotation of first seat row 4 by plate 8 being simultaneously ensured due to an, in particular, automatic pushing of consoles 14, 15 into their release positions.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An arrangement for a vehicle interior, the arrangement comprising:
    at least one first seat disposed on a plate that is rotatably supported on a floor of the vehicle interior;
    at least one second seat disposed in the vehicle interior behind the at least one first seat; and
    at least one movably supported console that is movable along a rail disposed on the floor of the vehicle, the rail comprising:
        a first section disposed between the plate and a front of the vehicle interior;
        a second section disposed on the plate; and
        a third section extending from the plate to an area between the at least one first seat and the at least one second seat,
        wherein the second section is separable from the first section and the third section.

2. An arrangement for a vehicle interior, the arrangement comprising:
    at least one first seat disposed on a plate that is rotatably supported on a floor of the vehicle interior;
    at least one second seat disposed in the vehicle interior behind the at least one first seat; and
    at least one movably supported console that is movable along a rail disposed on the floor of the vehicle, the rail having a multi-part design and being disposed on the plate at least in areas,
    wherein the console is movable along the rail between a first position of use situated on the plate and a release position situated at a distance from the plate on the floor.

3. The arrangement according to claim 1, wherein a drive device for moving the console, which includes a linear chain guided in or on the rail, is assigned to the console.

4. The arrangement according to claim 1, wherein a drive device, which rotates the plate as needed, is assigned to the plate.

5. The arrangement according to claim 1, wherein a second console is assigned to the at least one second seat.

6. The arrangement according to claim 5, wherein the second console is movably supported along the rail.

7. The arrangement according to claim 5, wherein the first or second console includes at least one pull-out and/or fold-out table.

8. The arrangement according to claim 5, wherein the first or second console are adapted to be pushed together along the rail such that the tables of the first or second console form a shared table surface.

9. The arrangement according to claim 5, wherein the first or second console are provided with at least one illuminant on their ends facing each other, the luminous intensity and/or luminous color thereof changing as a function of a distance of the consoles from each other.

10. The arrangement according to claim 1, wherein at least one of the consoles has a display on at least one side.

11. A motor vehicle, comprising:
    a motor vehicle interior, the motor vehicle interior comprising an arrangement, the arrangement comprising:

at least one first seat disposed on a plate that is rotatably supported on a floor of the vehicle interior;

at least one second seat disposed in the vehicle interior behind the at least one first seat; and at least one movably supported console that is movable along a rail disposed on the floor of the vehicle, the rail comprising:

a first section disposed between the plate and a front of the vehicle interior;

a second section disposed on the plate; and a third section extending from the plate to an area between the at least one first seat and the at least one second seat, wherein the second section is separable from the first section and the third section.

12. An arrangement for a vehicle interior, the arrangement comprising:

a rotatable plate disposed on a floor of the vehicle interior;

a first seat disposed on the plate;

a second seat disposed in the vehicle interior behind the first seat;

a rail disposed along the floor of the vehicle, the rail comprising:

a first section disposed between the plate and a front of the vehicle interior;

a second section disposed on the plate; and a third section extending from the plate to an area between the first seat and the second seat; and at least one movably supported console that is movable along the rail, wherein the second section is separable from the first section and the third section.

13. The arrangement according to claim 12, wherein the second section of the rail passes through a rotation point of the plate.

14. An arrangement for a vehicle interior, the arrangement comprising:

a rotatable plate disposed on a floor of the vehicle interior;

a first seat disposed on the plate;

a second seat disposed in the vehicle interior;

a rail disposed along the floor of the vehicle, the rail comprising:

a first section disposed on the plate; and a second section disposed between the plate and a front of the vehicle or between the plate and a rear of the vehicle; and at least one movably supported console that is movable along the rail, wherein the first section is separable from the second section.

* * * * *